Figure 1:
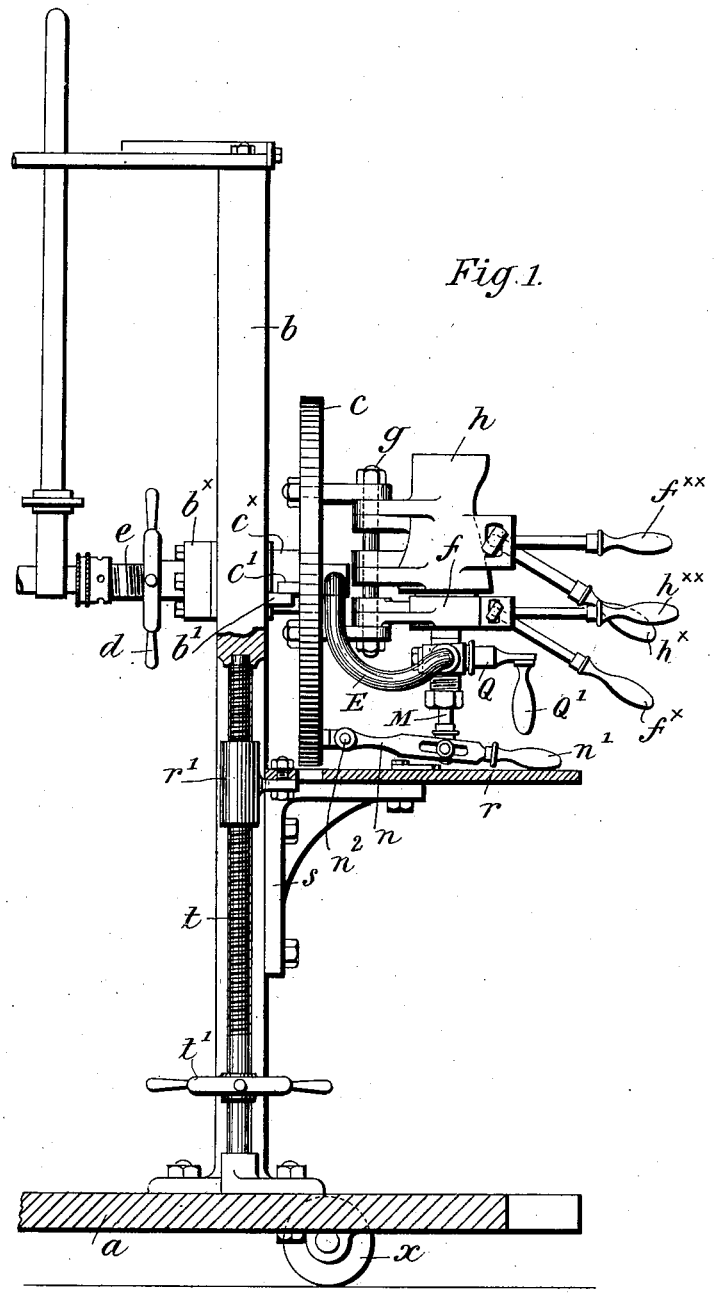

No. 628,313. Patented July 4, 1899.
L. GROTE.
MACHINE FOR MANUFACTURING GLASS BOTTLES.
(Application filed Oct. 21, 1898.)
(No Model.) 5 Sheets—Sheet 1.

No. 628,313. Patented July 4, 1899.
L. GROTE.
MACHINE FOR MANUFACTURING GLASS BOTTLES.
(Application filed Oct. 21, 1898.)

(No Model.) 5 Sheets—Sheet 2.

Witnesses:
John Chalmers Wilson.
C. A. Bateman.

Ludwig Grote,
Inventor
by Wilkinson & Fisher,
Attys.

THE NORRIS PETERS CO., PHOTO-LITHO., WASHINGTON, D. C.

No. 628,313. Patented July 4, 1899.
L. GROTE.
MACHINE FOR MANUFACTURING GLASS BOTTLES.
(Application filed Oct. 21, 1898.)
(No Model.) 5 Sheets—Sheet 3.
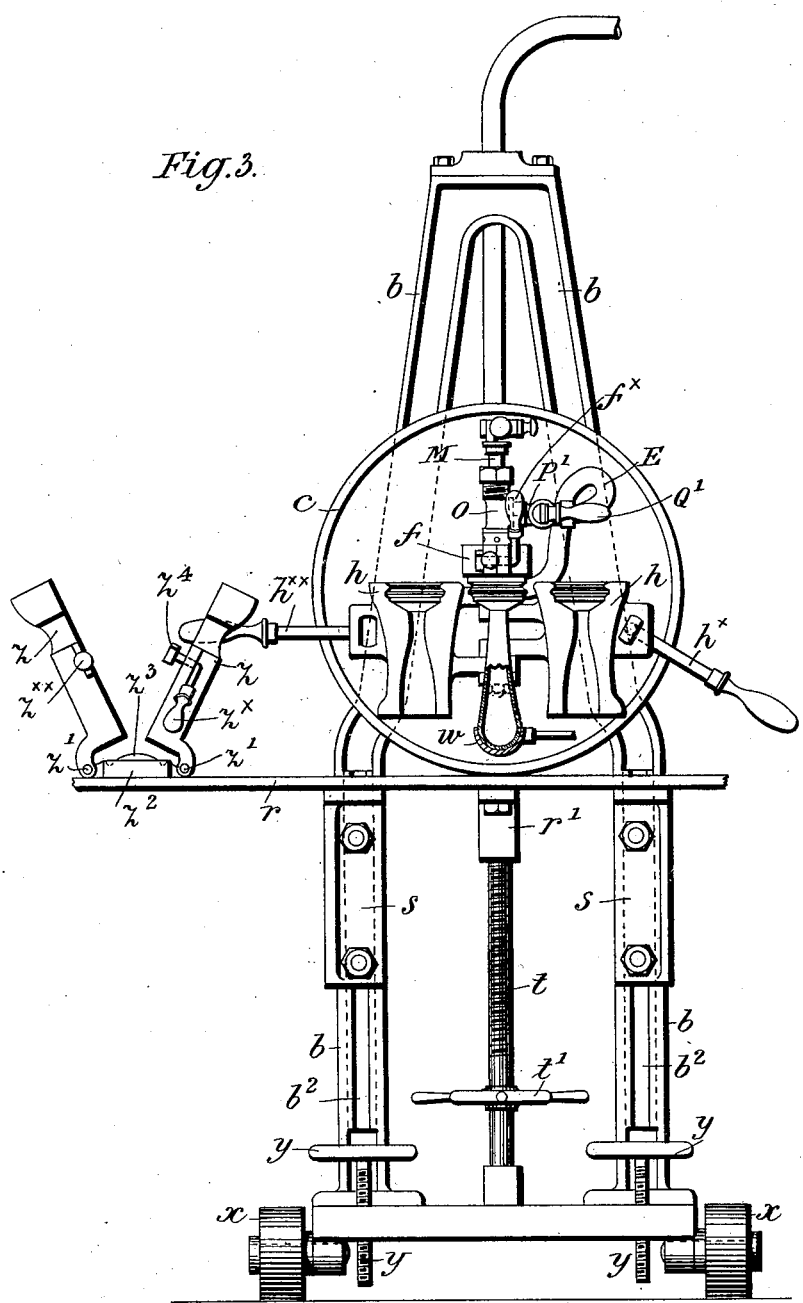

No. 628,313. Patented July 4, 1899.
L. GROTE.
MACHINE FOR MANUFACTURING GLASS BOTTLES.
(Application filed Oct. 21, 1898.)
(No Model.) 5 Sheets—Sheet 4.
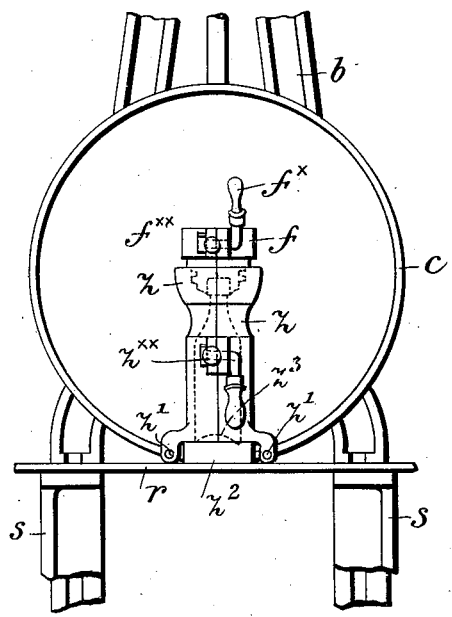

No. 628,313. Patented July 4, 1899.
L. GROTE.
MACHINE FOR MANUFACTURING GLASS BOTTLES.
(Application filed Oct. 21, 1898.)
(No Model.) 5 Sheets—Sheet 5.
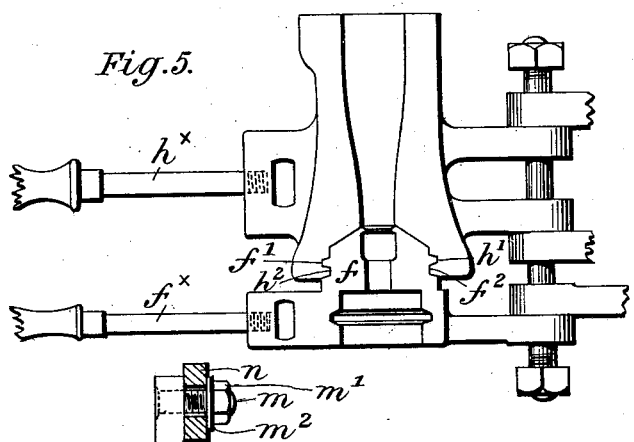
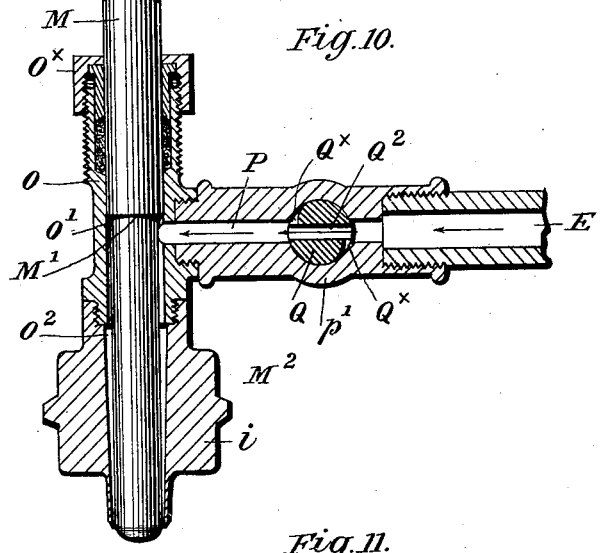
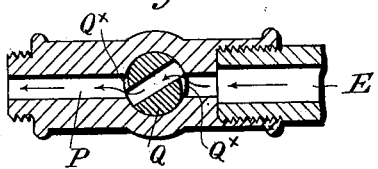
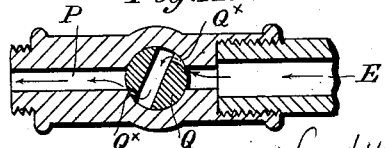
Witnesses: Ludwig Grote, Inventor
by Wilkinson & Fisher, Attys.
THE NORRIS PETERS CO., PHOTO-LITHO., WASHINGTON, D. C.

UNITED STATES PATENT OFFICE.

LUDWIG GROTE, OF LONDON, ENGLAND.

MACHINE FOR MANUFACTURING GLASS BOTTLES.

SPECIFICATION forming part of Letters Patent No. 628,313, dated July 4, 1899.

Application filed October 21, 1898. Serial No. 694,164. (No model.)

*To all whom it may concern:*

Be it known that I, LUDWIG GROTE, manager of works, a subject of the Emperor of Germany, residing at 84$^B$ East India Dock road, Poplar, London, England, have invented new and useful Improvements in Machines for the Manufacture of Glass Bottles, of which the following is a specification.

This invention relates to the manufacture of glass bottles by machinery and apparatus therefor or for use in conjunction therewith.

According to my present invention I provide and use a glass-measuring mold (or part mold) in conjunction with another mold or part mold (which I will term the "neck-mold") and a plunger for closing the end of this latter mold, and after inverting and filling the combined neck-mold and measuring-mold completely or to any desired point with molten glass the now locked together molds are then reversed and the lower mold opened and removed, leaving the mass of molten glass suspended by the neck, from the top end thereof—*i. e.,* depending from the neck-mold. This solid mass of molten glass, which is thus suspended in the open air and free from the mold, will extend itself in a downward direction, and I now work or manipulate said mass by means of a tool having a concavity therein somewhat spoon-shaped or other suitable implement and which I shall hereinafter refer to as the "spoon," and I also remove the plunger and gently admit air under pressure through the neck-mold into the depression formed by said plunger in the top of the neck part of the molten mass, and while the mass of glass is thus descending and while the air is being gently admitted I work (*i. e.,* support and shape) the bottom of the molten glass by means of the aforesaid spoon. Having thus in the open air partly formed the bottle and manipulated the bottom end of the latter with the aforesaid spoon and so prepared same for being inclosed in the final mold with the object that said bottom may be free from defects, I then inclose said partly-formed bottle in a final body-mold or part mold, which I firmly attach to the neck-mold and close tightly thereon, and then sufficient air under suitable pressure is admitted into the interior of the bottle to finally mold—*i. e.,* shape and finish—said bottle in its final form in the mold thus formed by the neck-mold and final body-mold in conjunction, whereupon this mold is opened, (*i. e.,* both the body-mold and the neck-mold are opened,) and the finished bottle is now removed.

My present invention consists, essentially, in the method and means employed for exactly measuring an equal quantity of molten glass for each bottle of a given size; also, the method and means of manipulating and working the bottom of the bottle or mass of depending molten glass in the open air and free from the mold and subjecting the suspended molten mass to a preliminary blowing operation; and, further, it consists in the construction and use of and method of using the three aforesaid molds or part molds—*i. e.,* first, the neck-mold and measuring-mold in combination; second, the use of the neck-mold by itself in conjunction with the spoon, and, third, the neck-mold and final mold in combination, forming neck part of bottle at once and in one and the same operation and from the same charge of molten glass as that from which the whole bottle is formed, applying the final body-mold (after preparation of the molten mass and partial blowing in the open and while free from the mold) in such wise that the corners and bottom end of the bottle may be free from defects; also, my improved system of admitting the air in a specially-regulated manner and in the employment of a plunger adapted to form a special depression of only a limited extent in the molten glass, special air-admitting device, special air-valves or means to repeatedly change the direction of the flow of the air-supply, and other details of construction and improvements, all as hereinafter fully described and finally pointed out in the claims.

Figure 2:
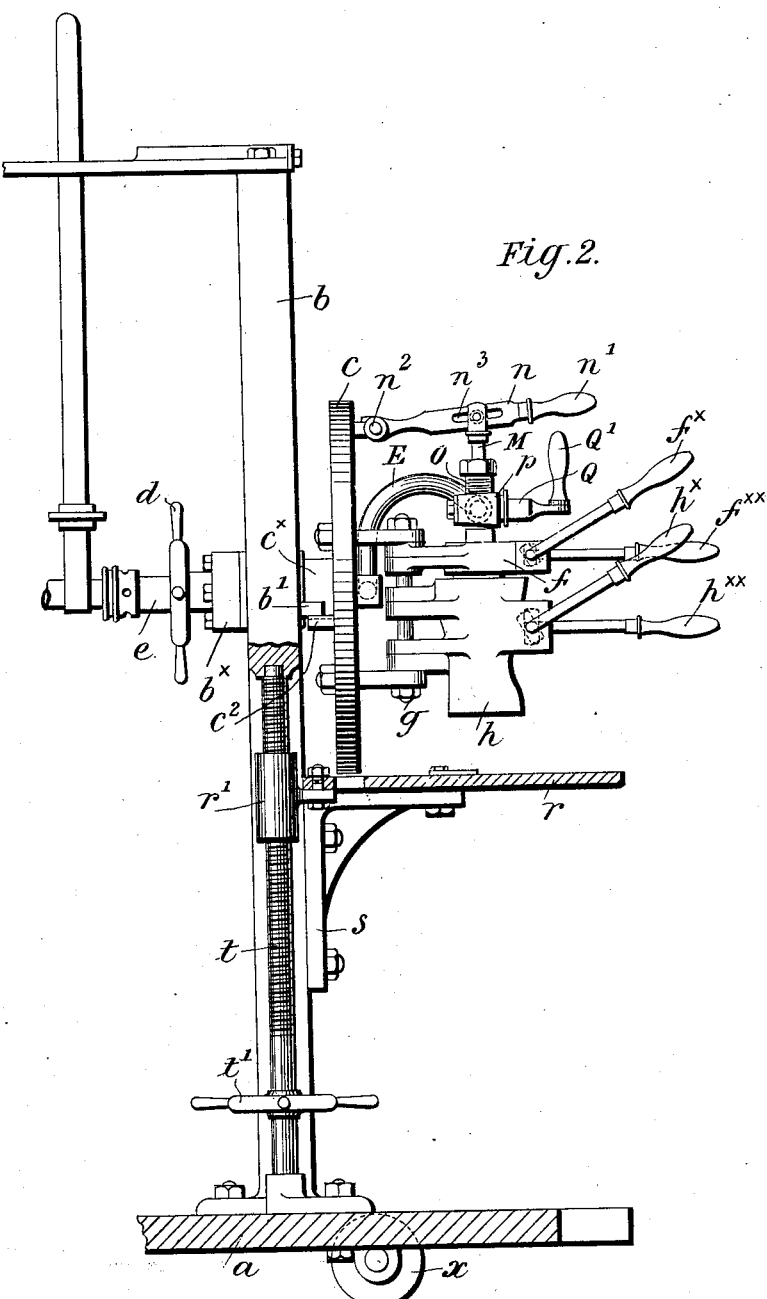

Referring to the accompanying drawings, Figure 1 is a side elevation of a glass-bottle-blowing machine according to my present invention—*i. e.,* with the neck-mold clasped onto a molding on the air-admission device and the measuring-mold clasped onto the neck-mold and inverted ready to receive the charge of molten glass. Fig. 2 is a view of the same machine, but with the measuring-mold and neck-mold reversed. Fig. 3 is a front view in elevation of Fig. 2, showing the measuring-mold open and laid back and the molten mass of glass—*i. e.*, the partly-formed bottle—held by and depending from the still closed neck-mold. Fig. 4 is a "local" front elevation—*i. e.*, at right angles to Figs. 1 and 2—showing the final body-mold placed in position around the partly-formed bottle and clasped on the neck-mold. Fig. 5 is a view, on an enlarged scale, of the measuring-mold inverted clasped to the neck-mold. Fig. 6 is a diagram of the partly-formed bottle, showing the spoon by which I manipulate or work the bottom of the molten glass. Fig. 7 is a view of the partly-formed bottle after manipulation by the aforesaid spoon. Fig. 8 is a view showing the finished bottle and the means for forming a flat bottom thereto with the central part of said bottom raised—*i. e.*, concaved—to form the "kick-up." Fig. 9 is a local vertical cross-sectional view of the neck-mold and plunger in position to form the depression in the upper end of the mass of molten glass depending from said neck-mold. Fig. 10 is a longitudinal vertical sectional view, on a greatly-enlarged scale, of the air-admission mechanism with the plunger and plunger-chamber or device through which said plunger or regulating-rod is adapted to slide, showing the air-admission cock wide open. Fig. 11 shows the air-admission valve partly closed. Fig. 12 shows the air-admission valve only very slightly open.

Similar letters of reference indicate corresponding parts throughout.

$a$ is platform carrying standard or frame $b$, which latter supports or carries thereon the various parts of the apparatus according to my present invention.

$c$ is vertical turn-table or face-plate journaled at $c^\times$ in the bearing $b^\times$ in said frame $b$ and having a stop $c'$, which comes against the stop $b'$, fixed or formed on the frame $b$, so as to limit the movement of said turn-table $c$ in one direction, and the stop $c^2$ to limit the movement of said turn-table in the other direction, or provided with other suitable means to hold said plate $c$ at the limit of the half-turn thereof.

$d$ is an adjusting-wheel by which the position of said plate $c$ (carrying the molds, &c.) can be adjusted with respect to the fixed frame $b$.

$e$ is air-supply pipe, which passes through the hollow trunnion or sleeve $c^\times$, on which the plate $c$ revolves, and terminates in the bent pipe E, leading to the interior of the mold.

$f$ is the neck-mold, made in two parts, hinged or pivoted on the hinge-pin $g$, carried on the face-plate $c$.

$h$ is the measuring-mold, made in two parts, also hinged on the hinge-pin $g$, the two parts of the neck-mold $f$ being provided with suitable means to fasten same together—for instance, in any well-known or suitable manner now employed for securing the two parts of a mold together—and the two parts of the mold $h$ are similarly provided or otherwise suitably arranged to be fastened together.

The exterior of the lower part of the neck-mold is of such a form as to be adapted to be clasped and locked to the measuring-mold, which latter is correspondingly formed internally, near one end—*i. e.*, the neck end—thereof. For instance, the exterior of the neck-mold $f$ may be formed, as shown in Figs. 5 and 9, with a circular tongue $f'$ and groove $f^2$, the interior of the neck end of the measuring-mold being formed as a counterpart thereto—*i. e.*, with corresponding groove $h$, and tongue $h^2$. (See Fig. 5.)

The upper end—*i. e.*, the neck end—of the final body-mold $z$ (see Fig. 3) is formed internally corresponding to the measuring-mold $h$, whereby said body-mold $z$ is adapted to be clasped on and locked tightly to the exterior of the neck-mold $f$, as shown in Fig. 4. Furthermore, the upper end of the neck-mold is formed internally as a counterpart to fit on and be clasped to the specially-shaped molding $i$, fixed, formed, or carried on the casing O of the air-admitting device, hereinafter described. (See Figs. 9 and 10.)

M is mandrel or plunger, which has the double purpose of serving when moved inward to cut off the air-supply and at same time to form a slight and specially-shaped depression (of concave form) in the molten glass and when moved in the opposite direction to admit an annular jet of air under pressure in a specially-regulated manner for the operation of blowing the bottle.

$n'$ is handle on the plunger-operating lever $n$, pivoted at $n^2$ to the turn-table $c$, this hand-lever $n$ being connected to the plunger M in any suitable manner, so that movement of the hand-lever $n$ is imparted to the plunger M. For instance, a pin $m$ on the outer end of the plunger M and extending laterally therefrom may pass through the slot $n^3$ in the hand-lever $n$, with a nut $m'$ and washers $m^2$ thereon. (See Figs. 2 and 10.)

The plunger M is advantageously made with two diameters—viz., it is of a smaller diameter at $M^2$ from the point $M'$ to the rounded end $M^3$ thereof—its cylinder or casing O being of two diameters internally and finally tapering—viz., the upper part from the stuffing-box or screw-cap $O^\times$ to the point $O'$ fitting closely the larger diameter of the plunger M—while below the shoulder $O'$ there is an annular space or clearance between the smaller part $M^2$ of the plunger M and the interior wall of the casing O down to the point $O^2$, and then the bore is tapered through the molding $i$, somewhat as shown in Fig. 10, and finally at the lower end of said bore it fits accurately and closely around the lower end of the plunger M near the specially-shaped (rounded) end $M^3$ thereof. (See Fig. 9.) With the bore or opening in said casing O the air pipe or passage E P is in communication, (see Fig. 10,) such passage being controlled by a valve or faucet Q of special construction, as follows: The valve-plug Q is advantageously of an ordinary taper form, fitting accurately and adapted to revolve in a correspondingly-tapered socket in the casing P' (see Fig. 10) and provided with means to tighten and secure same thereon, and furthermore provided with a handle Q', by which to turn said valve-plug Q in its casing. This plug Q has the ordinary passage $Q^2$ therethrough to allow communication from the passage E to the passage P; but according to my invention I provide graduated grooves or depressions $Q^\times$, which extend from each end of the passage $Q^2$ partly around the circumference of the plug and being deepest next the passage $Q^2$ gradually diminish in depth, as shown, the course the air-supply will be caused to take when this valve is only partially opened being a very divergent one, as shown in Figs. 11 and 12, respectively—i. e., the direction of the air-supply is repeatedly changed on its way to blow the bottle.

$r$ is work-table on which the body-molds $z$ may rest, (any suitable number of said molds being provided, as desired,) said table $r$ being carried and supported on the vertical slides $s$, which are guided by and slide vertically on the frame-pillars $b$ in the slots $b^2$ therein after the manner of a lathe-slide rest, $t$ being a vertical screw journaled in the said frame $b$ and adapted to be revolved therein, the said screw passing (screwing) through the internally-screw-threaded sleeve or nut $r'$, fixed on said table $r$, so that by revolving said vertical screw-shaft $t$—for instance, by a hand or spoke wheel $t'$—thereby the height of the work-table $r$ can be accurately adjusted—i. e., lowered or raised—according to whether a longer or shorter type of bottle is to be made, and thus support the rather heavy body-mold $z$ thereon in just correct position to enable same to be closed around the partly-formed (party-blown) glass bottle and clasped and secured onto the neck-mold $f$, as shown in Fig. 4, without having to lift or raise said body-mold $z$ off the work-table $r$.

The final body-mold $z$ is shown vertically divided in two halves, each hinged at the bottom at $z'$ to the bottom $z^2$, the upper face of which latter may be of any suitable form, according to the character or shape which it is desired to impart to the bottom end of the bottle—flat, convex, concave, &c. In the case illustrated this bottom piece $z^2$ has the upper face $z^3$ thereof of a convex form (see Fig. 2) in order to form a corresponding concavity in the bottom of the finished bottle. (See Fig. 8.)

$y$ $y$, Fig. 3, are set-screws by which the whole machine (which may run on small wheels or rollers $x$) can be fixed to the floor or ground.

$u$, Fig. 9, is the mass (measured quantity) of molten glass depending from the closed neck-mold $f$ after the measuring-mold $h$ has been removed and before the blowing operation or self-extending action or manipulation with the spoon $w$ (shown in Figs. 3 and 6) has taken place.

The body-mold $z$ is provided with any suitable means to fasten the two halves firmly together when closed. For instance, a locking device $z^4$ (on a movable handle $z^\times$ on one-half of the mold) is adapted to be locked into the other half, which latter is provided with a fixed handle $z^{\times\times}$, and similarly with respect to the part molds $f$ and $h$, respectively provided with handles $f^\times$ $f^{\times\times}$ and $h^\times$ $h^{\times\times}$ and any suitable means to fasten together the two parts of each said mold when closed.

The operation is as follows: I commence by filling quite full of molten glass the preliminary mold formed by the combined neck-mold and measuring-mold $h$ in the inverted position and locked together, as shown in Fig. 1. By this means an equal quantity of glass is obtained with certainty in making each bottle of any given size. The preliminary mold $f$ $h$ is next reversed into the position shown in Fig. 2, and the measuring-mold $h$ (which is now in position underneath the neck-mold $f$) is opened and removed or laid back, as shown in Fig. 3, whereby the lump of molten glass $u$ hangs freely suspended from the still-closed neck-mold $f$. The lump $u$ is now worked by means of the shaping spoon or ladle $w$ and subjected to a preliminary and gentle blowing operation (by withdrawing the plunger M and slightly opening the valve Q of the air-supply) while thus suspended from the neck in the open air with the body part of the said mass $u$ uninclosed by the measuring-mold or any mold. After the lump has been worked with the shaping-spoon $w$ and partly blown, as shown in Figs. 3, 6, and 7, uninclosed—i. e., in the open air—then in order to finish the blowing and finally and properly shape the bottle (particularly the bottom of the bottle) the body-mold $z$ is now moved into position around the depending partly-blown bottle (see Fig. 3) and is closed and clasped upon or affixed to the neck-mold (see Fig. 4) and there secured, as hereinbefore set forth, and the body-mold $z$ now completely surrounds the said partly-formed bottle, Figs. 3 and 6. The full air-supply is now admitted to the interior of the bottle, and as soon as the bottle has been thoroughly blown within the finishing-mold, formed by the combined neck-mold $f$ and body-mold $z$, these latter are opened and the now molded and finished bottle (still resting on the bottom of the body-mold, open as in Fig. 3) is detached from the neck-mold and set aside to cool down. The cooling can be effected apart from the machine, and any number of body-molds $z$ can be employed for the same machine, whereby a considerable economy of time is effected.

With reference to the manipulation of the bottom of the bottle with the shaping-spoon $w$, which has been already mentioned, when the measuring-mold $h$ is opened the mass of molten glass $u$ exhibits the form shown in Fig.

9. To form the bottom of the bottle, its lower portion is then shaped by working it in the hollow of the hemispherical shaping-spoon $w$, the employment of gentle air-pressure, coupled with suitable movements of the spoon, imparting a uniform shape all over the bottom, as shown in Figs. 6 and 7. In this manner the formation of lumps or inequalities in the wall of the made bottle is avoided and any such that may already exist in the molten glass are dispersed or distributed. Fissures and irregularities of surface are also removed by this method, and consequently the structure of the bottom is regulated in such a manner that the mass is not forced out and driven apart laterally as the result of pressure. This treatment with the shaping-spoon is advantageously commenced when the mass of molten glass $u$, Fig. 9, begins to sink, this procedure affording ample time for carefully and accurately performing the task in hand during the interval occupied by the sinking of the glass to the desired extent and during the preliminary blowing operation, and, moreover, this special manipulation of or operation on the bottom insures the entire absence of corners and angles in this part of the bottle.

On removing the spoon $w$ the greater heat of the upper portion of the molten glass extends freely to the lower portion, which has become somewhat cooler, so that the completion of the bottle proceeds rather quickly. If now the body-mold $z$ be put in position underneath, the coolest portion of the bottle takes up a position in direct contact with the bottom $z^2$ of the mold without being able to tear or fissure. The hot portion, however, is exposed to the force of tension (extension) by its own weight, so that the formation of the bottom edge consequently proceeds with ease. This treatment is the reverse to that of existing or former methods, since heretofore the thick inner portion of the mass of molten glass was the hottest and the edge part the coolest and most brittle, so that the formation of the bottom edges was a difficult matter, whereas by means of the present treatment this operation (the formation of the bottom edges) is facilitated.

The machine may be made single, as shown, or double—i. e., two apparatus back to back—or more than two such apparatus may be arranged and mounted in one machine.

I do not confine myself to always using exactly the same quantity of glass for making each bottle of a given size, as it will be obvious that I may vary such quantity if required or desired.

Having now described my invention, what I claim as new, and desire to secure by Letters Patent of the United States, is—

1. In a machine for making glass bottles, the combination with a frame, a disk having a shaft journaled in the said frame, and an air-passage through the said disk and shaft, a sleeve mounted on the said disk and connected with the said air-passage, a plunger within the said sleeve and means for reciprocating the said plunger, of a spindle mounted upon the said disk, a neck-mold formed in two parts, each part being pivoted upon the said spindle, and means for locking the two parts upon the end of the said sleeve, a measuring-mold, also formed of two parts pivoted upon the said spindle, and means for locking the two parts together and to the said neck-mold, substantially as described.

2. In a machine for making glass bottles, the combination with a frame, a disk having a shaft journaled in the said frame, and an air-passage through the said disk and shaft, a sleeve mounted on the said disk and connected with the said air-passage, a plunger within the said sleeve and means for reciprocating the said plunger; of a spindle mounted upon the said disk, a neck-mold formed in two parts, each part being pivoted upon the said spindle, and means for locking the two parts upon the end of the said sleeve, a measuring-mold, also formed of two parts pivoted upon the said spindle, means for locking the two parts together and to the said neck-mold, a spoon for working the unfinished bottle, and a finishing-mold, adapted to take the place of the measuring-mold, substantially as described.

3. In a machine for making glass bottles, the combination with a frame, a disk having a shaft journaled in the said frame, and an air-passage through the said disk and shaft, a hand-wheel and screw for adjusting the said shaft and disk, a sleeve mounted on the said disk and connected with the said air-passage, a plunger within the said sleeve and means for reciprocating the said plunger; of a spindle mounted upon the said disk, a neck-mold formed in two parts, each part being pivoted upon the said spindle, and means for locking the two parts upon the end of the said sleeve, a measuring-mold, also formed of two parts pivoted upon the said spindle, means for locking the two parts together and to the said neck-mold, means for working the unfinished bottle, a finishing-mold adapted to take the place of the said measuring-mold, a vertically-adjustable table mounted to slide upon the said frame, and a screw and hand-wheel for adjusting the said table, substantially as described.

4. In a machine for making glass bottles, the combination with a frame, a disk having a shaft journaled in the said frame, and an air-passage through the said disk and shaft, a sleeve mounted on the said disk and connected with the said air-passage, the opening through the said sleeve being reduced at one end, a plunger fitting closely in one end of the said sleeve, and being reduced to leave an air-space therearound and to fit closely the reduced end of the said sleeve, and means for reciprocating the said plunger; of a spindle mounted upon the said disk, a neck-mold formed in two parts, each part being pivoted upon the said spindle, and means for locking the two parts upon the end of the said sleeve, a measuring-mold also formed of two parts pivoted upon the said spindle, means for locking the two parts together and to the said neck-mold, substantially as described.

5. In a machine for making glass bottles, the combination with a frame, a disk having a shaft journaled in the said frame, and an air-passage through the said disk and shaft, of a sleeve mounted on the said disk, a plunger in the said sleeve fitting closely in one end and being reduced to leave an air-passage toward the other end, molds adapted to be secured to the open end of the said sleeve, an air-pipe connecting the air-passage through the shaft with the air-passage in the said sleeve, a valve in the said air-pipe having a plug provided with a central opening therethrough, graduated grooves extending from the ends of the said central opening partly around the said valve-plug, and means for turning the said valve-plug to regulate the flow of air, substantially as described.

LUDWIG GROTE.

Witnesses:
HERBERT D. JAMESON,
FRED. G. LUNNON.